Figure 1:
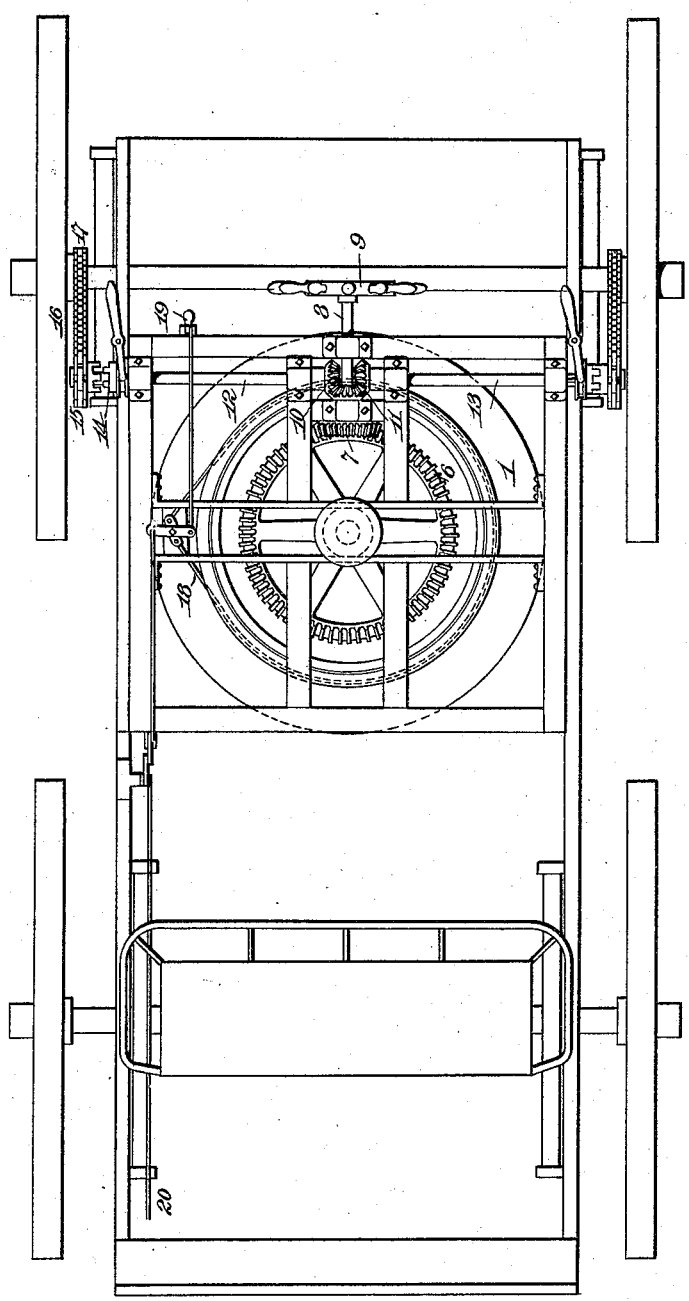

T. P. TUITE.
HOSE SUPPORTER.
APPLICATION FILED APR. 13, 1908. RENEWED NOV. 18, 1912.

1,152,672.

Patented Sept. 7, 1915.
4 SHEETS—SHEET 1.

Witnesses:
Jas. F. Coleman
John S. Lotsch

Inventor
Thomas P. Tuite
By Dyer & Dyer
Attorneys.

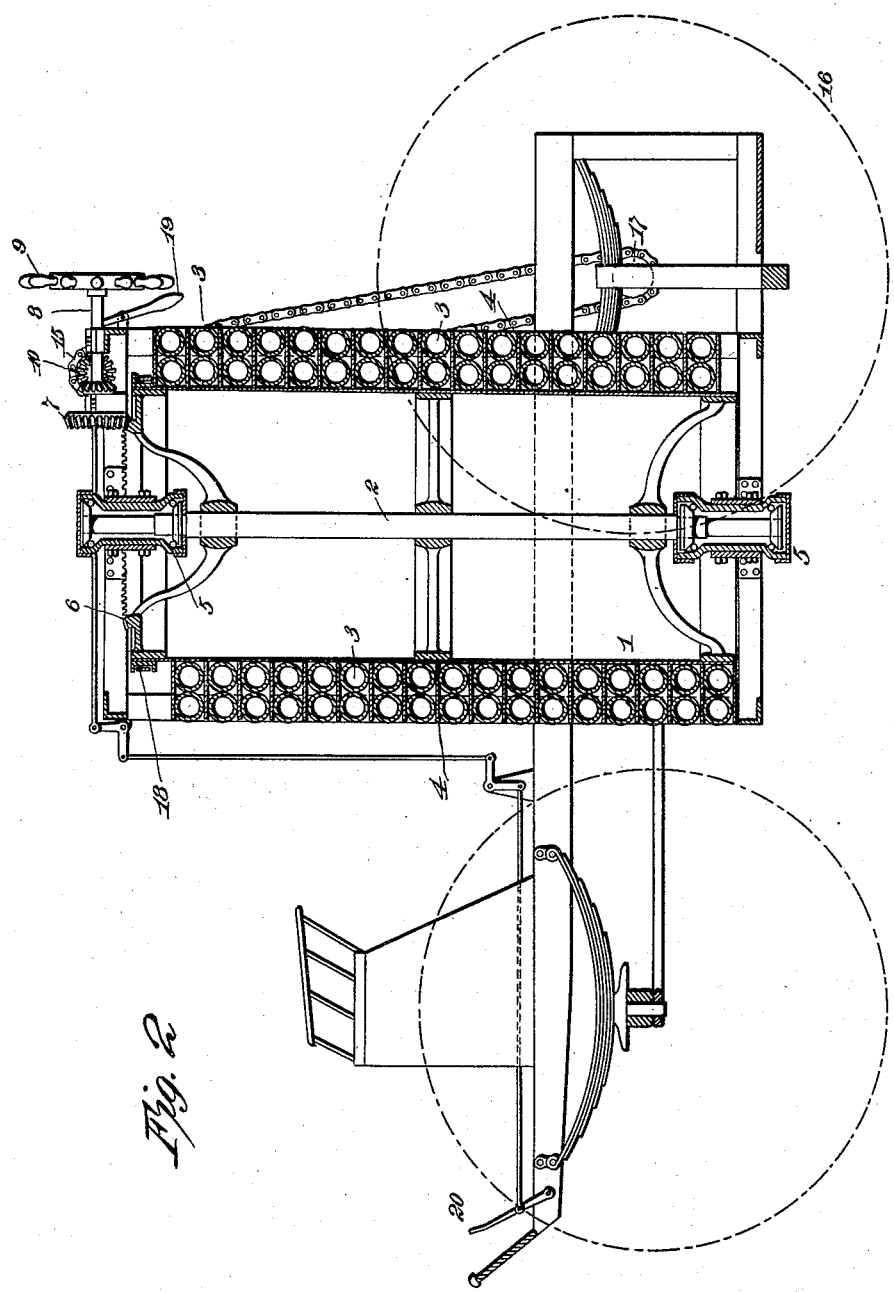

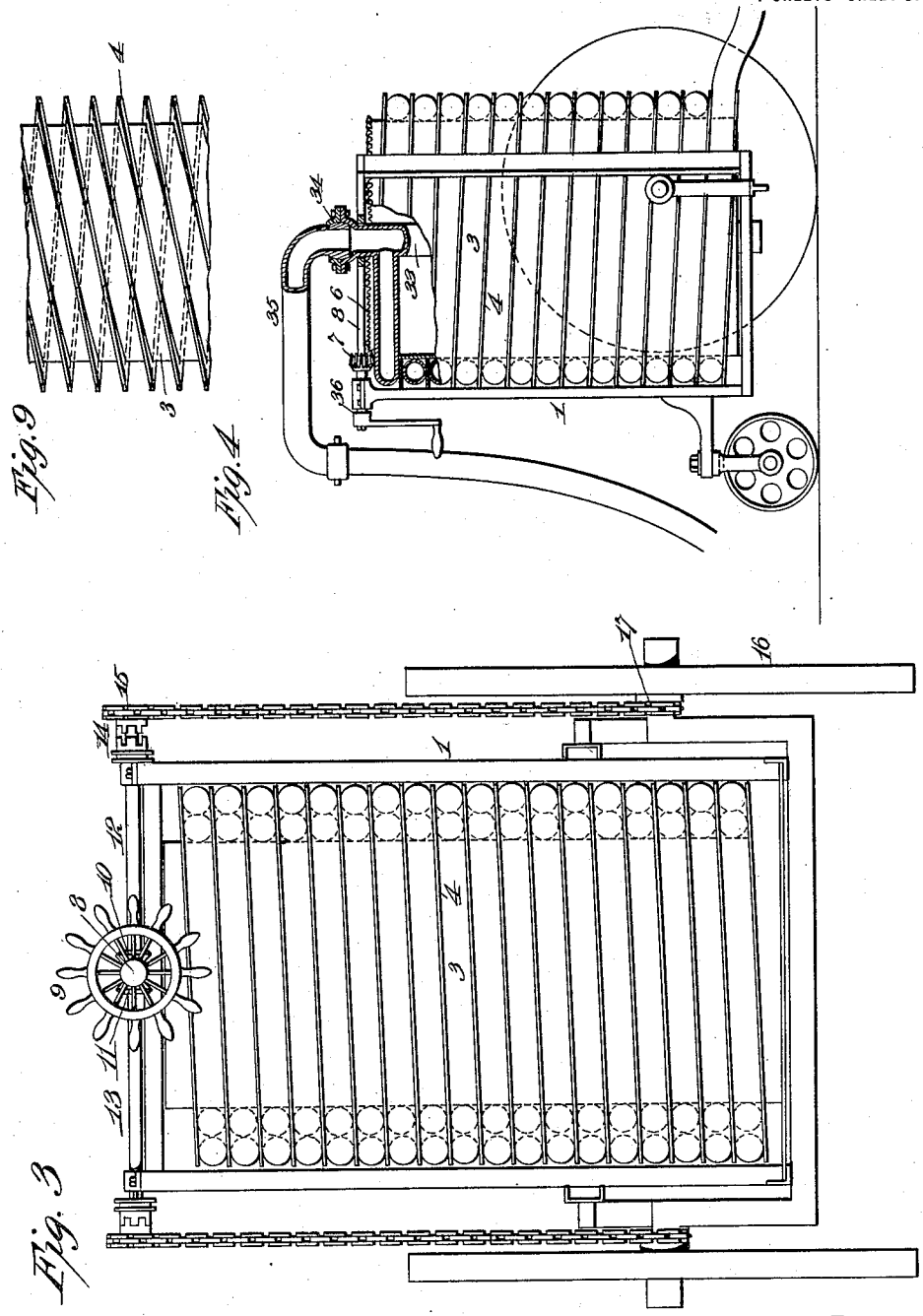

T. P. TUITE.
HOSE SUPPORTER.
APPLICATION FILED APR. 13, 1908. RENEWED NOV. 18, 1912.
1,152,672. Patented Sept. 7, 1915.
4 SHEETS—SHEET 4.
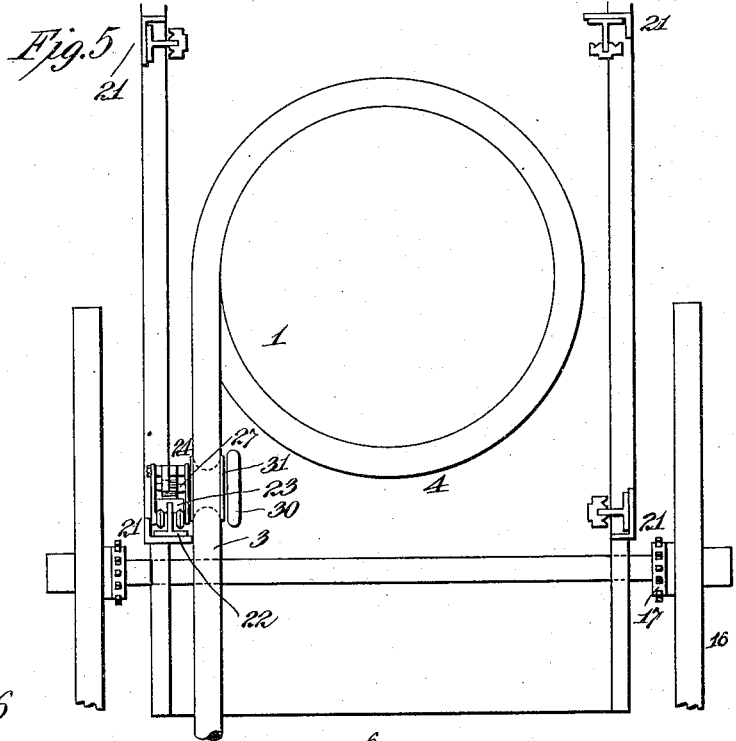
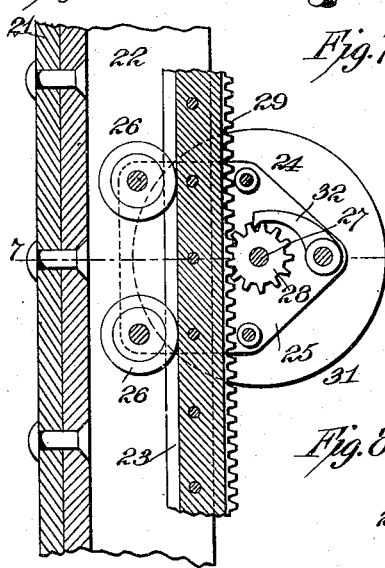
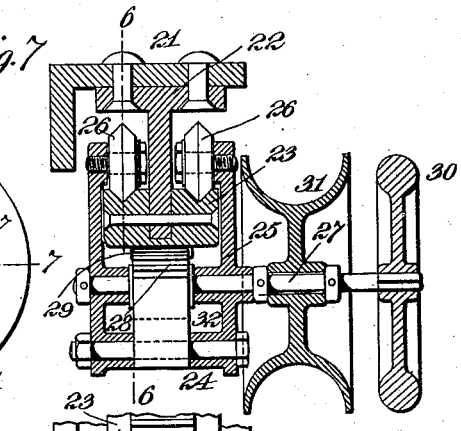
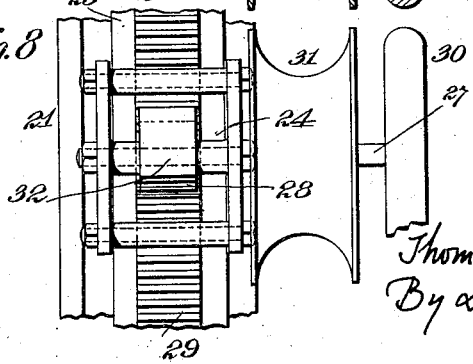
Witnesses:
Jas. F. Coleman
John T. Folsch
Inventor
Thomas P. Tuite
By Dyer & Dyer
Attorneys.

UNITED STATES PATENT OFFICE.

THOMAS P. TUITE, OF NEW YORK, N. Y.

HOSE-SUPPORTER.

1,152,672.  Specification of Letters Patent.  Patented Sept. 7, 1915.

Application filed April 13, 1908, Serial No. 426,651. Renewed November 18, 1912. Serial No. 732,131.

*To all whom it may concern:*

Be it known that I, THOMAS P. TUITE, a citizen of the United States, and a resident of the borough of Manhattan, city, county, and State of New York, have invented a new and useful Hose-Supporter, of which the following is a specification.

The object I have in view is the production of a device for supporting hose in such a manner that it may be readily removed from or put upon the support and in which its life and usefulness will be increased.

Further objects are to produce a support for the hose in which the water contained in the hose will readily drain off, and in which the hose will be supported without sharp bends and kinks, and in which chafing will be prevented.

Additional objects will appear from the following specification and accompanying drawings.

In the drawings, Figure 1 is a plan view of a hose carriage having incorporated therein a hose supporter embodying my invention. Fig. 2 is a longitudinal section thereof. Fig. 3 is a rear elevation thereof. Fig. 4 is a side elevation partly in section of a modification. Fig. 5 is a fragmentary plan view of a portion of the hose supporter showing the means for feeding the hose upon its support. Fig. 6 is a detail taken on the line 6—6 of Fig. 7. Fig. 7 is a section taken on the line 7—7 of Fig. 6. Fig. 8 is a side elevation of the apparatus illustrated in Figs. 6 and 7; and Fig. 9 is a detail of a modification.

In all of the views like parts are designated by the same reference characters.

In carrying out my invention I provide a support for the hose in which the hose will be supported in the form of a vertical spiral.

One embodiment of my invention comprises a drum or reel 1, which is supported upon a vertical shaft 2 in bearings so that it will turn. The hose 3 is supported upon a spiral flange 4, such spiral flange being secured to the drum (see Figs. 2 and 3). The distance between the coils of the spiral flange should be slightly greater than the diameter of the hose where the latter rests upon the flange. The width of the flange may be as great as desired so as to carry one or more layers of the hose; two layers are shown in Figs. 1, 2 and 3, and one layer in the structure shown in Fig. 4. When the hose is used in connection with a hose carriage for fire department purposes, the length of the spiral should be proportioned so as to be as long as the number of lengths of hose which are ordinarily coupled together. The width of the spiral may be proportioned so as to carry as many lengths of hose as is necessary. The shaft 2 is adapted to be rotated so as to wind the hose upon the drum or to allow it to be unwound therefrom. Instead of the single spiral shown, a plurality of such spirals may be used, as shown in Fig. 9, so that several different lengths or sizes of hose may be used and may be independently removed. This is advantageous as some fire departments carry $2\frac{1}{2}$, 3, $3\frac{1}{2}$, 4 and $4\frac{1}{2}$ inch hose, and they may need to use any one of them first. Should there be but one spiral, and should the required size be on the inside, there would be confusion and delay.

The advantages of sustaining the hose upon a spiral supporter turning upon a vertical axis are many, and so far as I know, such a suggestion has never before been made. By supporting the hose upon a spiral flange, the convolutions of the hose are kept separate, consequently the upper turns of the hose are not supported by the lower turns of the hose, but each turn of hose is supported upon the flange, consequently the hose is not under pressure and is not subjected to chafing, which causes wear which is incident to the ordinary hose supporter, namely, a horizontal reel upon which the hose is wound, or a box in which it is folded. This folding is one of the most serious abuses of hose; the walls of the hose kink, unduly straining or stretching the hose at this point. Another advantage is that the hose can freely drain before it freezes, or if freezing occurs the hose will not be broken when being wound up. If freezing occurs after the hose is wound up, it can be thawed out in the fire-house or station without unreeling the hose.

The ordinary form of reel mounted upon a horizontal axis, which is used for fire hose, is open to at least two objections; one of these objections is that the hose when wound upon the reel will not be entirely free from water which will accumulate on the lower side of the reel. Unless the hose is unwound and drained within a short time it is liable to rot. If the water freezes in the hose, then when the hose is unwound from the reel, breakage and bursting of the hose will result. Another objection is that the convolutions of the hose being turned upon themselves, when the reel is unwound rapidly, the centrifugal force will throw out the coils, resulting in an uneven delivery, which will jerk the hose from the hands of the men unreeling it, necessitating that the unreeling action must take place more slowly than is otherwise desirable. The ordinary form of reel also often lays an irregular line of hose, and such irregularity under high pressure delivery causes wiggling or snake-like movement to start in the hose, which increases as the water advances toward the point of discharge, and requires additional labor to secure the hose nozzle, which sometimes escapes from the pipemen, and lashing about causes damages, even to fatalities.

By means of my improved hose supporter, the hose will freely drain; there will be no accumulation of ice within it, and it may be unwound from the reel as rapidly as desired, owing to the fact that the convolutions are kept separate.

A further advantage of my invention is that, in connection with fire hose, a length of hose may be carried upon a supporter with its ends free, so that when it is unwound the hose will rotate upon its own axis, so to speak, and kinking will be avoided. This overcomes the objection to the ordinary form of hose-reel, in which the hose is not free to turn upon its own axis owing to the compressing action of the several convolutions, consequently when it is unwound it is found to be twisted. This necessitates untwisting before the hose can be used.

My invention is susceptible of many refinements and modifications. I illustrate several embodiments, all showing reels supported upon carriages, but it is understood that the reel may not be so supported and may be used in other situations, therefore my invention is not limited to a hose carriage. The device may be embodied in a stationary upright reel on which spare hose may be placed to drain it after fires, in place of the present general plan of suspending such hose in a high tower or flue, which is now the direct cause of much injury to the hose by the reason of the entire weight being suspended from its upper joint or coupling, thus weakening it.

In connection with the hose carriage, however, I have shown several attachments which are particularly applicable to my form of hose supporter. Referring to Fig. 2, it will be seen that the shaft 2 is supported in ball-bearings 5—5 at the upper and lower ends which permit the free and ready turning of the hose and its support. The drum or reel 1 may be rotated by unwinding the hose, or it may be rotated by mechanism which comprises a horizontal gear 6 turning with the drum or reel, and a pinion 7 engaging with the gear. This pinion 7 is carried by a short shaft 8, which also carries a hand-wheel 9. The drum or reel may be readily turned in either direction by means of this hand-wheel. As an additional means of turning the drum or reel, I may employ the pinions 10 and 11, carried upon the shafts 12 and 13 respectively. The shaft 12 is provided with a clutch 14, which connects with a sprocket pinion 15. This sprocket pinion is rotated by means of a chain, which engages with a sprocket wheel 17, turned by one of the supporting wheels 16 of the vehicle. The shaft 13 is provided with similar driving mechanism, as shown, connected with the other driving wheel. Each clutch is provided with an operating lever, as shown. By engaging one clutch and disengaging the other, and then moving the vehicle, the drum or reel will be turned in one or the other direction, depending upon which clutch is in engagement, as is apparent.

For the purpose of controlling the rotation of the drum, I provide a brake 18, which is shown in the form of a hand-brake connecting with the drum. This brake may be applied by means of a lever 19 or a pedal 20, through the system of levers and bell cranks shown. In the structure illustrated, the drum may be rotated in either direction by moving the vehicle in either direction, or the drum may be rotated in either direction by means of a hand-wheel 9, or the hose may be hauled off by hand, while the speed of rotation of the drum may be controlled by the driver of the vehicle by means of the pedal 20, or by one of the attendants on the back-platform by means of the lever 19.

For the purpose of feeding the hose to the structure illustrated in Figs. 1, 2 and 3, the mechanism illustrated in Figs. 5 and 8 may be employed. Adjacent to each corner of the drum is a vertical track comprising two angle irons 21. These angle irons may be the supports for the upper bearing of the drum. To each angle iron is secured a T iron 22, which carries a double track 23. A small carriage, indicated by the character 24 (see Fig. 5) traverses this double track and moves in a vertical direction. As shown, the carriage has a body 25, which straddles the track, and is provided with bearing wheels 26, which engage with the track. On the opposite side of the body is a shaft 27, which carries a spur gear 28, which engages with a rack 29, such rack being carried by or made integral with the double track 23. The spur gear 28 is connected to the shaft 27 so as to turn with the latter. The shaft may be rotated by means of a hand-wheel 30. A guide pulley 31 is carried by the shaft, and is provided with a groove of proper size to support the hose. A pawl 32, carried by the carriage body, is adapted to engage the spur gear 28. As shown in Fig. 6, this pawl, engaging with the spur gear, will hold the carriage in position, and prevents accidental descent. The carriage may be used upon any of the four tracks, and will properly guide the hose to the reel to wind it in the proper direction.

In the modification of my invention illustrated in Fig. 4, the drum is provided with a spiral flange, as already described, of sufficient width for one coil of hose. The hose is permanently attached to the drum and is connected to the hollow shaft 33, so as to make a through connection therewith. This shaft is connected by means of a universal joint 34 to a lead 35, which may either be the inlet or the outlet of the system. The drum in this embodiment is rotated by means of the crank gear 36, as illustrated. This system is specially applicable to stationary or portable chemical fire engines or extinguishers, also for stationary fire service in homes, hotels, institutions, ships, etc., also for oil, compressed air, vacuum, hydrant service, gases, etc.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

A hose supporter having an upright reel, means for supporting the reel, a vertical track adjacent to the reel, a carriage on the track, a pulley on the carriage, a rack on the track, a pinion on the carriage engaging with the rack, a pawl engaging with the pinion and means for rotating the pinion.

This specification signed and witnessed this thirtieth day of March, 1908.

THOMAS P. TUITE.

Witnesses:
 LEONARD H. DYER,
 JOHN L. LOTSCH.